United States Patent [19]

Mazza

[11] Patent Number: 5,391,384

[45] Date of Patent: Feb. 21, 1995

[54] PROCESS FOR CONTROLLING AFTER-COOKING DARKENING IN PAR-FRIED FRENCH FRIED POTATOES

[76] Inventor: Giuseppe Mazza, 431 7th Street, Morden, Manitoba, Canada, R0G 1J0

[21] Appl. No.: 261,238

[22] Filed: Jun. 14, 1994

Related U.S. Application Data

[63] Continuation of Ser. No. 897,082, Jun. 11, 1992, abandoned.

[51] Int. Cl.$^6$ .............................................. A23L 1/217
[52] U.S. Cl. ................................... 426/267; 426/268; 426/271; 426/321; 426/438; 426/441; 426/637
[58] Field of Search ............... 426/267, 268, 271, 321, 426/637, 438, 441

[56] References Cited

U.S. PATENT DOCUMENTS

| | | |
|---|---|---|
| 2,031,243 | 2/1936 | Wolf. |
| 2,212,461 | 8/1940 | Swartz. |
| 2,322,516 | 6/1943 | Horvath. |
| 2,448,152 | 8/1948 | Patten et al. |
| 2,893,878 | 7/1959 | Simon et al. |
| 2,894,843 | 7/1959 | Malecki et al. |
| 2,987,401 | 6/1961 | Johnston. |
| 3,051,578 | 8/1962 | Kitzke. |
| 3,063,849 | 11/1962 | Nelson et al. |
| 3,634,095 | 1/1972 | Willard .............................. 426/441 |
| 4,272,554 | 6/1981 | Schroeder et al. ............. 426/637 X |
| 4,767,630 | 8/1988 | Silver et al. ......................... 426/102 |
| 4,818,549 | 4/1989 | Steiner et al. ....................... 426/267 |
| 4,911,940 | 3/1990 | Steiner et al. ....................... 426/262 |
| 4,988,523 | 1/1991 | Gardner et al. ..................... 426/268 |

OTHER PUBLICATIONS

Gennadios, A. and C. L. Weller. 1990. Edible films and coatings from wheat and corn proteins. Food Technol. 44(10): 63–69.

Guilbert, S. 1986. Technology and application of edible protective films. In: 'Food Packaging and Preservation: Theory and Practices', ed. M. Mathlouthi, pp. 371–393, Elsevier Appl. Sci. Publ. Co., London.

Heisler, E. G., J. Siciliano, C. F. Woodward and W. L. Porter 1964, After-cooking discoloration of potatoes. Role of the organic acids, J. Food Sci. 29: 555–564.

Hughes, J. C. and T. Swain. 1962a. After-cooking blackening in potatoes. II. Core experiments J. Sci. Food Agr. 13,229.

Hughes, J. C., J. E. Ayers and T. Swain. 1962. After-cooking blackening in potatoes. I. Introduction and analytical methods. J. Sci. Food Agri. 13,224.

LeDuy A., J. E. Zajic and J. H. T. Luong. 1988. Pullulan. In: Encyclopedia of Polymer Science and Engineering. vol. 3, pp. 650–660. eds. H. F. Mark et al. Wiley Pub., Toronto, Canada.

Ng, K. G. and M. L. Weaver. 1979. Effect of pH and temperature on hydrolysis of disodium acid pyrophospate (SAPP) in potato processing. Am. Potato J. 56: 63–69.

Reineccius, G. A. 1990. Role of carbohydrates in flavour encapsulation. Paper No. 652, presented at Annual Meeting of the CFT, Anaheim, Calif., Jun. 16–20.

Smith, O. 1958. Potato quality. X. Post harvest treatments to prevent after-cooking darkening. Am. Potato J. 35: 573–584.

Smith, O. and C. O. Davis. 1960. Preventing discoloration in cooked and French fry potatoes. Am. Potato J. 37: 352.

Smith, O. and C. O. Davis. 1962b. Potato quality. XIII. Preventing after-cooking discoloration in oil-blanched French fries. Am. Potato J. 39: 45–56.

Smith, O. and Muneta, P. 1954. Potato quality. VIII. Effect of foliar applications of sequestering and chelating agents on after cooking darkening. Am. Potato J. 31: 404–409.

Sugimoto, K. 1990. Pullulan production and applications. J. Ferment. Ass. (Japan) 36(2): 98–108.

Thomas, P., S. Adam and J. F. Diehl. 1979. Role of citric acid in the after-cooking darkening of-irradiated potato tubers. J. Agric. Food Chem. 27, 519.

Primary Examiner—Arthur L. Corbin
Attorney, Agent, or Firm—Sim & McBurney

[57] ABSTRACT

Water blanched, cooked potato strips which normally discolor upon exposure to air, are treated with a combination of a calcium ion component and an oxidation inhibitor, to simultaneously complex the chlorogenic acid present on the surface of the potato strips with the calcium ions and to also complex the ferrous iron which is present on the surface of the potato strips to prevent oxidation and subsequent discoloration. Such pretreated potato strips are then partially fried to produce an improved potato product for french frying. Calcium acetate preferably is employed.

17 Claims, 6 Drawing Sheets

PROCESS FOR CONTROLLING AFTER-COOKING DARKENING IN PAR-FRIED FRENCH FRIED POTATOES

This is continuation of application Ser. No. 897,082, filed Jun. 11, 1992, now abandoned.

FIELD OF THE INVENTION

This invention relates to a process for controlling or preventing after-cooking darkening in par-fried potato food products.

BACKGROUND TO THE INVENTION

After potatoes are cooked, they develop a dark bluish-grey pigmentation known as after-cooking darkening. This pigmentation is due to a complex of ferric ($Fe^{3+}$) ions with chlorogenic and/or caffeic acids. In freshly cooked potatoes, a colourless chlorogenic acid-ferrous iron ($Fe^{2+}$) complex is formed, and is subsequently oxidized in air to the coloured chlorogenic acid-ferric iron complex.

Various factors are known to affect after-cooking darkening, and the role of organic acids, especially citric acid, has received the most attention from researchers. Juul (1949) showed that the discolouration was influenced by citric acid and he attributed it to a pH effect. Beta-Smith et al. (1958) recognized that citric acid has a chelating effect and stated that the distribution of blackening in individual tubers was governed mainly by the competition between chlorogenic acid and citric acid for iron. Hughes and Swain (1962) studied the effect of citric acid, orthophosphoric and malic acid on the colour of various phenol-iron complexes and concluded that citric acid was the most important of these factors in reducing the intensity of colour of the chlorogenic acid-iron complex. In 1963, Heisler et al. reported significant correlation coefficients between the degree of discolouration and the content of the citric acid in potatoes. Thomas et al. (1979) attributed the induction of after-cooking darkening in irradiated potatoes to decreased citric acid and increased polyphenols in the tuber tissues.

Many products have been reported to reduce or prevent after-cooking darkening in various foods. These include sodium acid pyrophosphate (SAPP) (Smith 1958; Smith and Davis, 1960, 1961, 1962a,b,c,d; Davis and Smith, 1964), ethylenediamine tetraacetic acid (EDTA) and its salts (Smith and Muneta, 1954), gluconic acid, citric acid, sodium gluconate, sodium citrate, ammonium gluconate, and sodium bisulfite (Smith, 1987). It is believed that these chemicals reduce pigmentation by sequestering or chelating the iron in the potato so that it is held in a nonionizable form and cannot take part in a reaction with chlorogenic acid, thereby preventing the formation of the dark coloured pigment. Fellers and Morin (1962) obtained a patent on the prevention of after-cooking darkening with several chemicals of the EDTA group.

Most french fry processors do not use any of the above chemicals, with the exception of SAPP which is now used routinely for the treatment of blanched potato products before frying and freezing. SAPP treated potatoes can develop a bitter chemical taste (Ng and Weaver, 1979; Smith 1987), and more recently it has been reported to be a concern to chemical additive-conscious consumers. In addition, SAPP is disadvantageous in view of its cost.

There exists a need to provide an improved process of achieving prevention of after-cooking darkening of french fries.

In spite of the apparent importance of iron and organic acids, the literature reports no attempt to simultaneously complex the chlorogenic with calcium ions ($Ca^{2+}$) and the ferrous iron with an organic acid. Alternative products or processes to SAPP and other chelating or complexing agents are required.

Edible food coatings made from starches, gums, proteins, dextrin, lipids and derivatives have been suggested for the protection of other kinds of food products against moisture and oxygen (Guilbert, 1986; Gennadios and Weller, 1990). The use of dextrins, starches and gums in flavour encapsulation has been recently reviewed (Reineccius, 1990). It has also been reported that pullulan, a water soluble polysaccharide has oxygen-barrier and film forming characteristics, (LeDuy et al., 1988; Sugimoto, 1990). However, none of these procedures is entirely satisfactory.

A search has been conducted in the facilities of the United States Patent and Trademark Office with respect to the patentability of the invention and the following United States patents were cited as the most relevant art:

| | | |
|---|---|---|
| 2,031,243 | 3,051,578 | 2,212,461 |
| 3,063,849 | 2,448,152 | 4,767,630 |
| 2,322,516 | 4,818,549 | 2,893,878 |
| 4,911,940 | 2,894,843 | 4,988,523 |
| 2,987,401 | | |

Several of the above patents disclose the use of calcium for pretreating potatoes. U.S. Pat. No. 2,031,243 discloses the use of a mixture of ionic species, including calcium, in cooking and various food applications; U.S. Pat. No. 2,448,152 discloses pretreating potato pieces with a calcium salt, typically calcium chloride, to avoid discolouration in potato chips; U.S. Pat. No. 2,893,878 discloses treatment of potatoes with calcium chloride to inhibit browning of raw potatoes; U.S. Pat. No. 2,894,843 discloses the treatment of freshly peeled potatoes with calcium sulfite to inhibit discolouration of the raw vegetable; U.S. Pat. No. 2,987,401 discloses treatment of peeled potatoes with calcium phytate to inhibit discolouration of the raw potato; U.S. Pat. No. 3,051,578 discloses the treatment of potatoes with EDTA and salts thereof, including calcium, for preventing greening in unpeeled potatoes; U.S. Pat. No. 3,063,849 discloses the production of dehydrated cooked potatoes by precooking potato slabs in water containing calcium ions; U.S. Pat. Nos. 4,818,549 and 4,911,940 disclose treating apple cubes with a solution containing calcium chloride; and U.S. Pat. No. 2,322,516 discloses the treatment of soya with various salts, including calcium acetate.

In addition, U.S. Pat. No. 2,212,461 discloses the preparation of french fried potatoes in which the potato strips are soaked for a prolonged period prior to cooking in a solution of acetic acid to avoid a non-uniform colour and burnt taste arising from high sugar levels. U.S. Pat. No. 4,767,630 discloses the production of sliced dried fruit or vegetable chips in which the chips are treated with a composition which includes an anti browning agent, which may be a variety of organic acids, prior to dehydration. U.S. Pat. No. 4,988,523 discloses a treatment of peeled fruit and vegetables with a medium of phosphate salts and citric acid.

The procedure of dipping blanched potato strips in calcium acetate solution in order to control after-cooking darkening of french fries in accordance with the present invention is not disclosed in any of the foregoing patents.

SUMMARY OF THE INVENTION

The present invention is directed towards a novel process for controlling or preventing after-cooking darkening in par-fried potato food products which reduces or eliminates the disadvantages of the methods heretofore used.

According to an aspect of the invention, there is provided a process for controlling or preventing after-cooking darkening in par-fried potato food products, which comprises forming pretreated potato strips by contacting blanched, rinsed potato strips with an agent which inhibits after-cooking darkening. The agent employed comprises a calcium ion component which complexes any chlorogenic acid which may be present, and an oxidation inhibitor component which prevents the ferrous ion complex from coming into contact with oxygen and forming the coloured complex. After pretreating, the potato strips are partially fried.

GENERAL DESCRIPTION OF INVENTION

In the process of the invention, an agent is used to treat potato strips. Such agent may comprise a material or a mixture of materials fulfilling both the requirements of complexing chlorogenic acid and inhibiting oxidation, or may be a combination of materials each fulfilling one of the requirements.

The agent used preferably comprises calcium acetate in a 0.5 to 1 wt % solution. The calcium acetate may be employed in a concentration of about 0.5 to 1 wt % preferably at a pH of about 4 to 5. This solution is used to contact the potato strips for about 30 to 60 seconds. In this procedure, the calcium acetate fulfills both the requirement of complexing chlorogenic acid and inhibiting oxidation. The calcium ion complexes the chlorogenic acid while the acetate ion inhibits oxidation of the ferrous ion.

Alternatively, the process may include using a combination of about 0.4 to 0.5 wt % calcium acetate with about 0.2 to 0.3 wt % disodium acid pyrophosphate (SAPP). It is current commercial practise for the control of after-cooking darkening in french fries to use 0.8 to 1% SAPP solution. This invention permits a lower concentration of SAPP to be used or to be eliminated entirely in order to save costs, calcium acetate being a much cheaper chemical; while achieving a satisfactory prevention of after-cooking darkening.

In another embodiment of the invention, the agent may comprise calcium chloride or a calcium-containing carbohydrate, such as a gum or the like, either alone or in combination with about 0.1 to 0.2 wt % SAPP. The calcium-containing carbohydrate may also be pullulan, a water-soluble polysaccharide synthesized by Aurdebasidium pullulans, or any one of a group of selected gums or starches. Preferred gums are Spraygum, Sealgum and acacia gum. Pullulans may be PF-30 or PF10. Starches may be N-Lok, Purity gum, Melojel. Combinations containing about 2 wt % gum and about 1 wt % calcium chloride at pH of about 5 are preferred to the commercially used treatment of SAPP 0.5 wt %.

Combinations of Sealgum-CaCl$_2$ or Spraygum-CaCl$_2$ inhibit after-cooking darkening in potatoes by using the gum to prevent the oxidation of the colourless chlorogenic acid-Fe$^{2+}$ complex and by the ability of Ca$^{2+}$ to compete with Fe$^{2+}$ for chlorogenic acid, thereby preventing or reducing the formation of the coloured chlorogenic acid-Fe$^{3+}$ complex.

In another embodiment of the invention, calcium chloride is combined with pullulan to form an oxygen impermeable film which is colourless, transparent, tasteless, odourless and nontoxic.

EXAMPLES

Example 1

Treatment with Calcium Acetate

Potato strips were made from Russet Burbank potatoes grown commercially in southern Manitoba in 1990 and taken out of 7° C. and 90% relative humidity storage and conditioned at room temperature for 2 to 3 hours before being peeled and trimmed and cut into 1×1 cm strips. The strips were weighed and water blanched at 83° C. (±2°) for 9 minutes. After blanching, they were dipped into various concentrations of calcium acetate and a control sample was dipped into 0.8 wt % disodium acid pyrophosphate (SAPP) solution at pH 5. The calcium acetate solutions were at concentrations of 0, 0.25, 0.5, 1.0 or 2.0 wt % calcium acetate in distilled water. The calcium acetate solutions were adjusted to pH 3, 4, 5 or 7, with concentrated acetic acid. After dipping, all samples were dried at various temperatures and pan-fried in vegetable oil at 185° F. for 30 seconds. They were then cooled and evaluated for colour. In addition, blanched potato strips were dipped into solutions containing 0.1, 0.2 or 0.4 wt % SAPP and then sequentially dipped in solutions of 0.25, 0.5, 1.0 or 2.0 wt % calcium acetate.

A six member sensory panel assessed the colour of the samples using the procedure of magnitude estimation and with a Hunterlab tristimulus colorimeter (Model D25L-9, Hunter Associates Laboratory, Reston, Va.).

The panelists' magnitude estimates were transformed and equalized prior to statistical analysis. Data were analyzed using descriptive statistics and correlation/regression packages available from SAS.

TABLE 1

Typical panelists raw magnitude colour values of par-fried french fries treated with selected products

| Treatments | P1[a] | P2 | P3 | P4 | P5 | Panelists raw magnitude colour values Average ± Sd |
|---|---|---|---|---|---|---|
| 0.25% Calcium Acetate | 4.3[b] | 5.5 | 4.8 | 3.6 | 6.4 | 4.91 ± 1.08 |
| 0.50% Calcium Acetate | 4.6 | 3.3 | 5.4 | 3.8 | 6.3 | 4.68 ± 1.21 |
| 1.00% Calcium Acetate | 6.1 | 7.2 | 8.5 | 7.1 | 8.2 | 7.42 ± 0.96 |
| 2.00% Calcium Acetate | 6.4 | 4.7 | 7.3 | 6.0 | 7.5 | 6.38 ± 1.13 |
| 1.00% Calcium Chloride | 3.5 | 5.1 | 7.3 | 5.7 | 4.8 | 5.28 ± 1.39 |
| 1.00% Sodium Citrate | 4.4 | 4.7 | 7.0 | 5.2 | 4.2 | 5.1 ± 1.13 |
| 2.00% Spray Gum | 1.8 | 2.6 | 3.8 | 3.1 | 3.3 | 2.92 ± 0.76 |
| 2.00% Spray Gum + 1.00% Calcium Chloride | 2.5 | 5.5 | 5.8 | 4.4 | 5.4 | 4.72 ± 1.35 |
| 0.8% SAPP | 7.2 | 8.4 | 9.5 | 7.9 | 10 | 8.6 ± 1.15 |
| Water | 1.0 | 1.8 | 1.6 | 1.6 | 1.2 | 1.44 ± 0.33 |

[a]P = panelist; pH of dipping solutions = 5; [b]scale of 0 to 10, 10 = light.

Table 1 shows the raw magnitude colour values of par-fried french fries treated with calcium acetate, SAPP and other products. It can be seen that compared to samples dipped in water and 0.8% SAPP solution, samples treated with calcium acetate were perceived by all panelists to be much lighter than samples dipped in water but not as bright as the samples dipped in the SAPP solution. At pH 4 to 5, 1% calcium acetate appeared to be the treatment nearest the commercially used SAPP treatment.

TABLE 2

Correlation coefficient (r) and slope (n) of line between colour of par-fried french fries and concentration of calcium acetate dipping solution at pH 3, 4, 5, 7

| Panel-ist | pH 3 r | pH 3 n | pH 4 r | pH 4 n | pH 5 r | pH 5 n | pH 7 r | pH 7 n |
|---|---|---|---|---|---|---|---|---|
| P1 | 0.89 | 0.31 | 0.46 | 0.09 | 0.76 | 0.28 | 0.91* | −0.27 |
| P2 | 0.10 | −0.003 | 0.94* | 0.18 | 0.14 | 0.04 | 0.20 | 0.04 |
| P3 | 0.89 | 0.14 | 0.20 | 0.20 | 0.95** | 0.23 | 0.99*** | 0.11 |
| P4 | 0.26 | 0.01 | 0.85 | 0.22 | 0.84 | 0.49 | 0.67 | 0.35 |
| P5 | 0.80 | 0.06 | 0.98** | 0.40 | 0.87 | 0.31 | 0.98** | −0.18 |
| P6 | 0.17 | 0.01 | 0.89 | 0.21 | 0.84 | 0.08 | 0.42 | −0.07 |
| x | 0.52 | 0.09 | 0.72 | 0.22 | 0.73 | 0.24 | 0.70 | −0.003 |

*P ≦ 0.01; P ≦ 0.05; *P ≦ 0.01.

Figure 1:
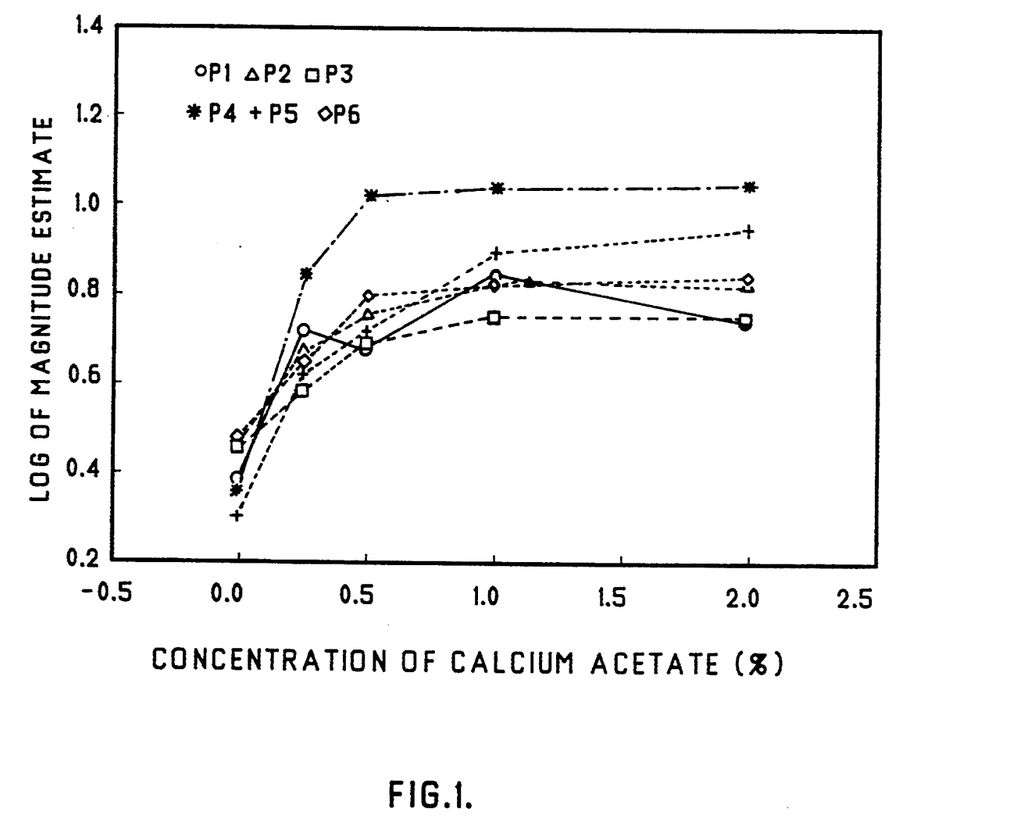
FIG. 1 is a graphical illustration of the relationship of perceived colour of french fries and concentration of calcium acetate.

Table 2 shows the relationship between the panelists perceived colour and concentration of calcium acetate in the dipping solution. At a given pH, the colour of the par-fried french fries tended to get lighter as the concentration increased. Linear correlation between the parameters, however, was generally low and there was no significant improvement in colour above a concentration of 1%, as can be seen in FIG. 1.

TABLE 3

Correlation coefficient (r) and slope (n) of line between colour of par-fried french fries and PH of calcium acetate dipping solutions at 0.25, 0.50, 1.0 and 2.0%

| Panelist | 0.25% r | 0.25% n | 0.50% r | 0.50% n | 1.00% r | 1.00% n | 2.00% r | 2.00% n |
|---|---|---|---|---|---|---|---|---|
| P1 | 0.68 | 0.55 | 0.72 | −0.42 | 0.53 | −0.30 | 0.60 | −0.54 |
| P2 | 0.62 | −0.40 | 0.82 | −0.82 | 0.91* | −0.64 | 0.51 | −0.40 |
| P3 | 0.20 | −0.08 | 0.73 | −0.24 | 0.97** | −0.28 | 0.40 | −0.06 |
| P4 | 0.87 | −1.67 | 0.96** | −2.22 | 0.96** | −1.06 | 0.91* | −0.99 |
| P5 | 0.37 | −0.38 | 0.68 | −0.54 | 0.97** | −0.73 | 0.94* | −1.04 |
| P6 | 0.20 | −0.09 | 0.93* | −0.53 | 0.98** | −0.51 | 0.99*** | −0.50 |
| x | 0.49 | −0.35 | 0.81 | −0.80 | 0.89 | −0.59 | 0.73 | −0.59 |

Figure 2:
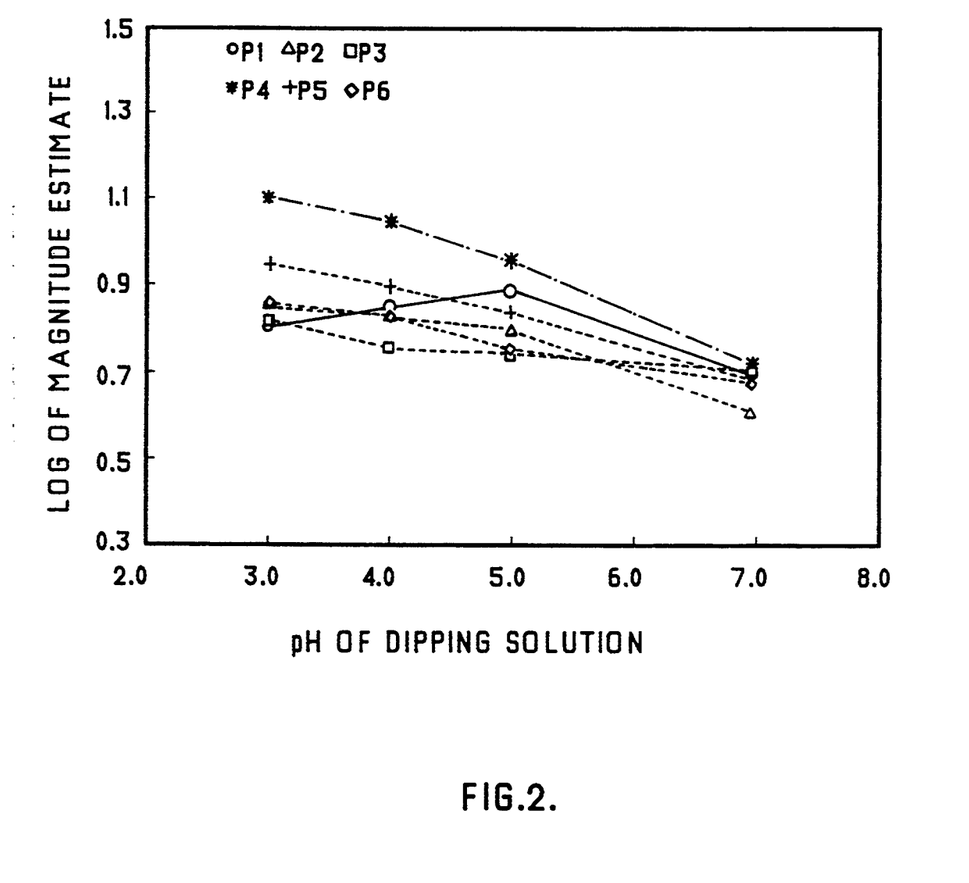
FIG. 2 represents the perceived colour magnitude estimates as a function of the pH of the dipping solution.
Figure 3:
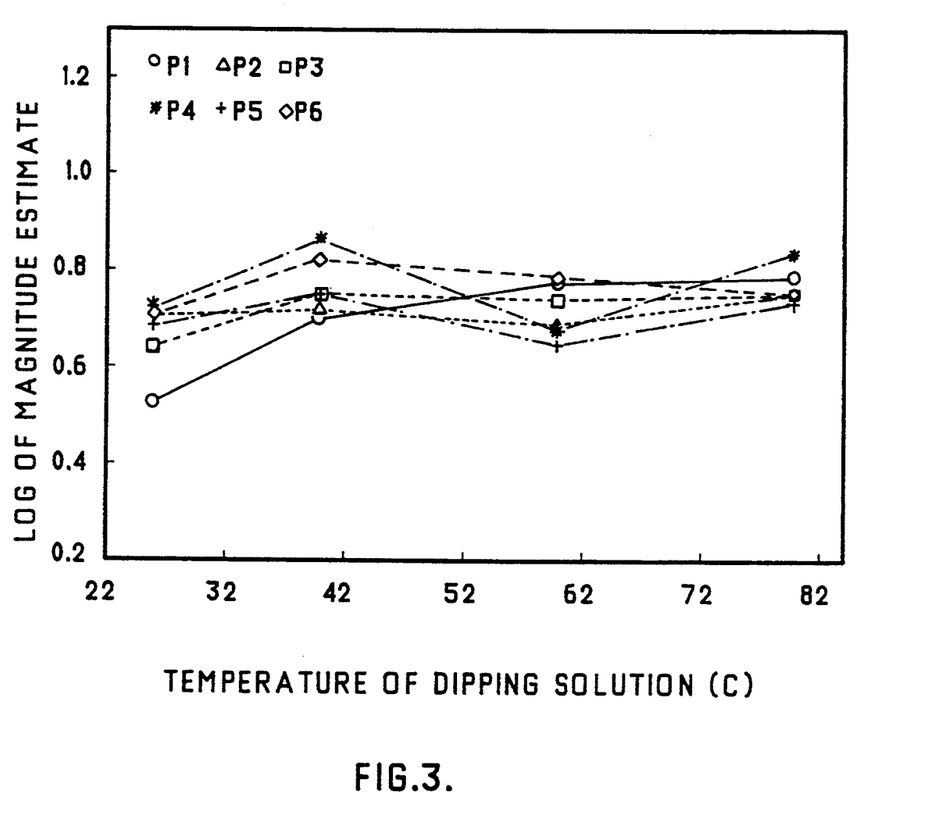
FIG. 3 represents the perceived colour magnitude estimates as the temperature of the dipping solution is varied.

*P ≦ 0.1; P ≦ 0.05; *P ≦ 0.01;

Table 3 shows the relationship between colour and pH of 1% calcium acetate solution. As the pH was increased from 3 to 7 the colour of the par-fried fries became progressively darker. FIG. 2 shows that the most effective calcium acetate treatment for the control of after-cooking darkening and for causing the least flavour alteration in french fries was achieved by dipping blanched slices in 0.5 to 1% solutions at pH 4 to 5. The effectiveness of calcium acetate as inhibitor of after-cooking darkening was generally higher at 40° to 80° than at 25° C. as shown in FIG. 3

Figure 4:
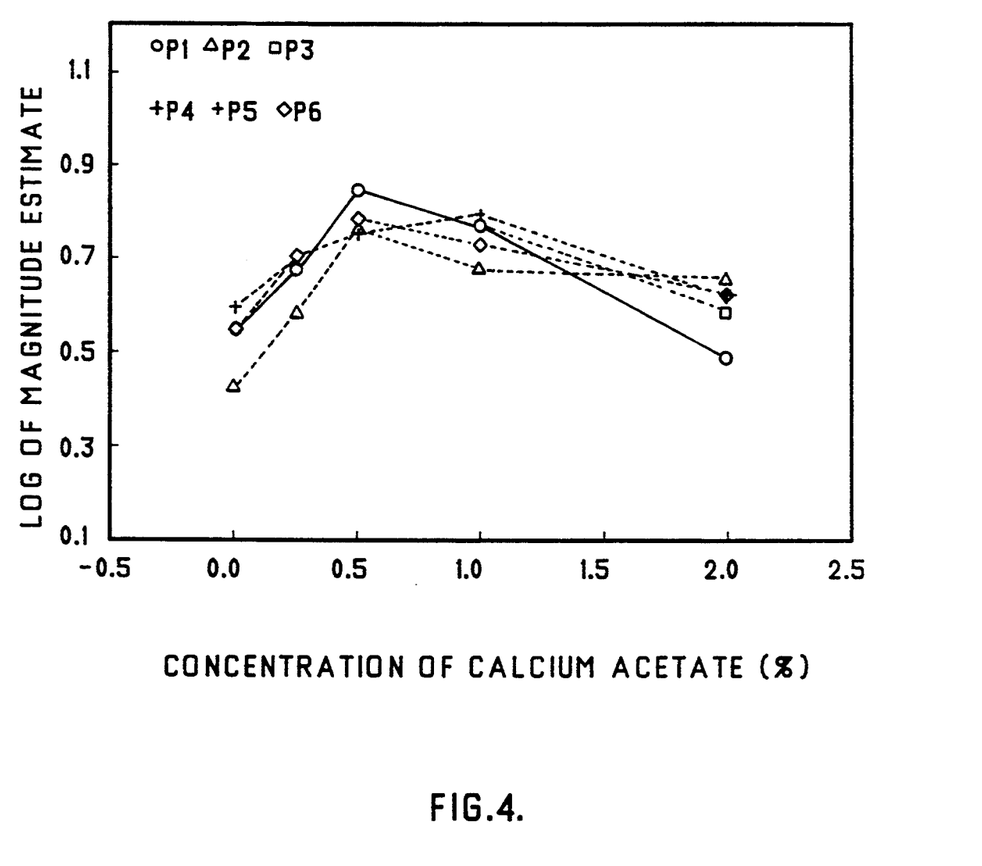
FIG. 4 depicts the magnitude estimates plotted against varying concentrations of calcium acetate treatment after dipping in a 0.1% SAPP solution.

FIG. 4 shows the effect of sequentially dipping the potatoes in a 0.1% SAPP solution and then in calcium acetate solutions of increasing concentration.

Figure 5:
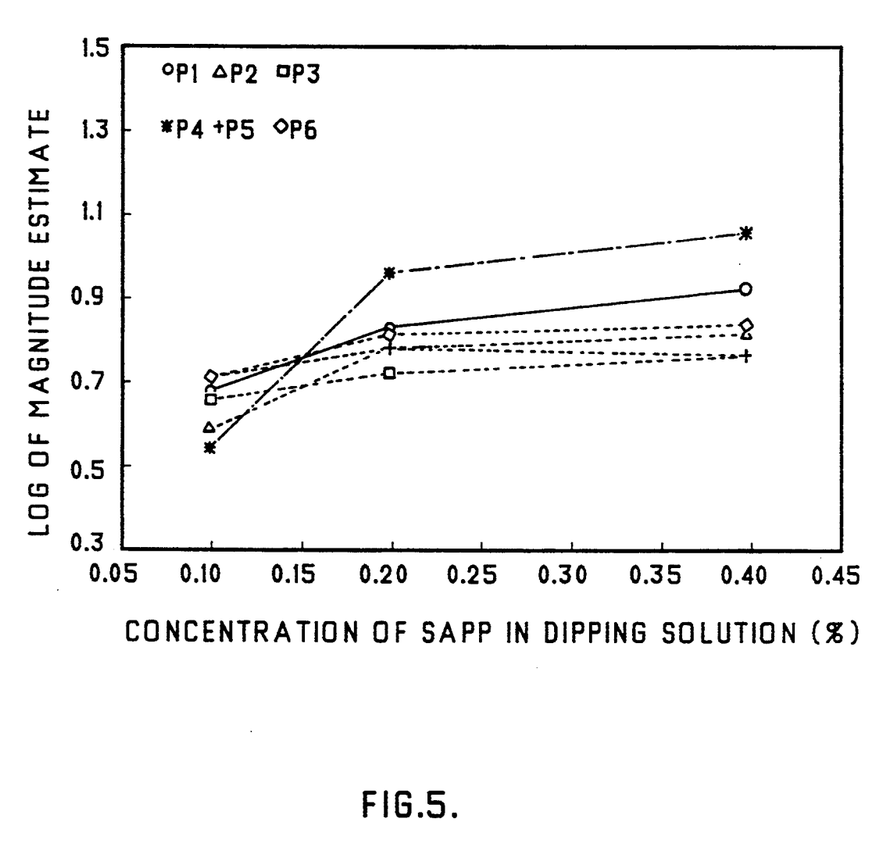
FIG. 5 is the graphic representation of magnitude estimates versus varying concentrations of SAPP plus 0.25% calcium acetate.

FIG. 5 shows the relationship between after-cooking darkening and concentration of SAPP solution for par-fried french fries dipped in SAPP solutions and in 0.25% calcium acetate at pH 5.

It can be seen that control of after-cooking darkening comparable to that obtained with the currently used commercial treatment of 0.8% SAPP or with 1% calcium acetate at pH 5 can also be obtained by dipping the blanched potato slices in 0.1% SAPP and then in 0.4 to 0.5% calcium acetate at pH 5.

Example 2

Calcium-Containing Carbohydrate

Calcium chloride alone or calcium-containing carbohydrates (gums) alone or in combination with 0.1 to 0.2 wt % SAPP were evaluated as after-cooking darkening inhibitors.

Russet Burbank potatoes grown and stored commercially in southern Manitoba in 1989-1990 were taken out of 5° C. and 90% relative humidity storage, peeled and trimmed, immersed into cold water and mechanically cut into 1×1 cm strips. The strips were then immediately placed in a cool water bath to avoid enzymatic discolouration. Strips were blanched at 83° C.

($\pm 2°$) for 8 minutes and rinsed with cold water for about 10 seconds and then dipped into a $Fe^{2+}$-chlorogenic acid aqueous solution for 1 minute to standardize development of the bluish-grey discolouration. The $Fe^{2+}$ chlorogenic acid solution was prepared by dissolving $1.25 \times 10^{-2}$ g chlorogenic acid (Sigma Chemical Co.) in 1 L of 0.1 wt % aqueous oxygen-free ferrous iron (Aldrich Chemical Company, Inc.). This $Fe^{2+}$-chlorogenic acid solution was prepared just prior to use and kept under $N_2$ to prevent oxidation. After pretreatment with $Fe^{2+}$ and chlorogenic acid, the blanched potato strips were coated by dipping the samples in aqueous solutions of calcium containing carbohydrates for 1 minute. Controls consisted of a sample dipped in distilled water, and a sample dipped in 0.5 wt % SAPP.

Instrumental colour measurement was done with a Hunterlab tristimulus colorimeter (Model D25L-9, Hunter Associates Laboratory, Reston, Va.). Colour parameters in different systems were recorded at regular intervals over a 10 hour cooling-storage period. In preliminary experiments all colour parameters were correlated with storage time and degree of discolouration of samples, and the Hunterlab parameters L and b were selected for the evaluation of anti-colouring treatments. It was determined that dipping of cooked potatoes in a solution containing 0.1 wt % ferrous $Fe^{2+}$ and 0.01 to 5 wt % chlorogenic acid for 1 minute gave a uniform, reproducible and measurable bluish-grey discolouration, resembling after-cooking darkening. The degree of darkening was monitored by reflectant measurements of the potato strips immediately after application of inhibitor and after storage of the strips for 1 to 10 hours at room temperature.

dipped in 2 wt % solutions of gums, pullulans, starches, cyclodextrin and 1 wt % calcium chloride. Results show that purified spraydried gum acacia (Spraygum) and coprocessed acacia gum and gelatin (Sealgum) showed considerable promise as inhibitors of after-cooking darkening in potatoes when used in combination with calcium chloride. Spraygum-calcium chloride or Sealgum-calcium chloride combinations were more effective as a darkening inhibitor than the gums or calcium chloride alone as can be seen in Table 4.

Figure 6:
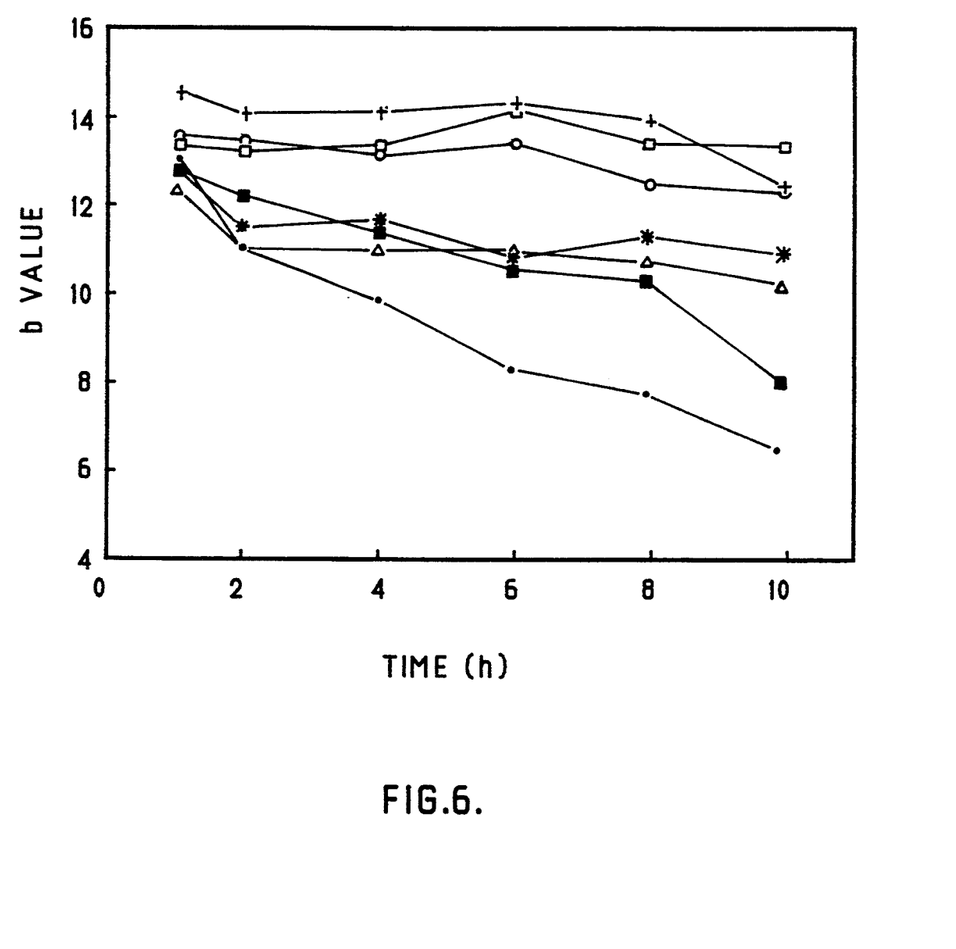
FIG. 6 represents the effect of selected treatments expressed as the change in Hunterlab colour parameter b over a 10 hour cooling-storage period.

FIG. 6 represents the change in b values over time for various treatments, where + indicates 0.5 wt % SAPP; □ indicates 2 wt % Spraygum and 1 wt % $CaCl_2$; ○ indicates 2 wt % Sealgum and 1 wt % $CaCl_2$; * indicates 2 wt % Spraygum; △ indicates 2% Seagum; ■ indicates 1 wt % $CaCl_2$; and ● indicates water.

TABLE 5

Inhibition of after-cooking darkening in potatoes by spray-dried gum acacia (Spraygum)

| Treatment | Percent Inhibition | | | | |
|---|---|---|---|---|---|
| | 2 h | 4 h | 6 h | 8 h | 10 h |
| 0.5% Spraygum | 40.7 ± 0.4$^e$ | 57.0 ± 0.9$^g$ | 54.8 ± 1.9$^f$ | 50.7 ± 1.7$^g$ | 46.0 ± 1.0$^g$ |
| 1% Spraygum | 77.0 ± 1.5$^d$ | 73.8 ± 2.2$^d$ | 66.8 ± 2.0$^e$ | 66.3 ± 1.1$^f$ | 64.6 ± 0.8$^f$ |
| 2% Spraygum | 78.9 ± 0.5$^d$ | 68.4 ± 1.4$^e$ | 73.7 ± 1.8$^d$ | 96.5 ± 1.9$^d$ | 72.5 ± 1.7$^e$ |
| 5% Spraygum | 73.3 ± 0.8$^e$ | 64.4 ± 1.4$^f$ | 69.4 ± 1.5$^e$ | 80.1 ± 1.4$^c$ | 91.4 ± 1.2$^c$ |
| 0.5% SAPP | 89.6 ± 2.3$^c$ | 79.1 ± 1.5$^c$ | 77.4 ± 2.0$^c$ | 72.8 ± 1.2$^e$ | 86.4 ± 2.6$^d$ |

$^a$% inhibition is based on the change of b value.
$^b$pH = 5
$^{c-g}$means of 3 to 5 replicates, means in each column followed by different superscripts significantly different at $p \leq 0.05$.

TABLE 4

% Inhibition of after-cooking darkening in potatoes by selected gums, pullulans, starches, cyclodextrin and calcium chloride

| Treatment | Percent Inhibition | | | | |
|---|---|---|---|---|---|
| | 2 h | 4 h | 6 h | 8 h | 10 h |
| 2% Spraygum | 78.9 ± 0.5$^f$ | 68.4 ± 1.4$^f$ | 73.7 ± 1.8$^e$ | 76.5 ± 1.9$^e$ | 72.5 ± 1.7$^e$ |
| 2% Spraygum + 1% $CaCl_2$ | 95.1 ± 0.7$^c$ | 101.7 ± 0.5$^c$ | 117.2 ± 0.4$^c$ | 82.5 ± 0.3$^d$ | 99.9 ± 1.0$^c$ |
| 2% Sealgum | 75.6 ± 2.3$^f$ | 67.1 ± 1.5$^f$ | 69.4 ± 2.0$^f$ | 10.8 ± 1.2$^f$ | 66.4 ± 1.6$^f$ |
| 2% Sealgum + 1% $CaCl_2$ | 94.4 ± 0.2$^c$ | 85.4 ± 0.7$^e$ | 96.2 ± 0.3$^d$ | 79.0 ± 0.3$^e$ | 79.8 ± 0.6$^d$ |
| 2% Acacia + 1% $CaCl_2$ | 34.8 ± 1.9$^i$ | 43.1 ± 2.5$^h$ | 45.1 ± 1.5$^i$ | 47.9 ± 2.8$^g$ | 42.3 ± 1.9$^g$ |
| 5% PF-10 | 27.7 ± 2.4$^j$ | 24.3 ± 3.0$^k$ | 15.4 ± 6.3$^n$ | 5.1 ± 4.4$^m$ | 4.0 ± 2.0$^k$ |
| 5% PF-10 + 1% $CaCl_2$ | 47.7 ± 1.8$^h$ | 35.3 ± 3.2$^j$ | 34.5 ± 1.6$^j$ | 30.6 ± 1.1$^j$ | 27.5 ± 1.2$^h$ |
| 5% PF-30 | 35.4 ± 2.5$^i$ | 26.3 ± 8.4$^k$ | 21.1 ± 2.8$^m$ | 8.4 ± 2.4$^m$ | 5.9 ± 8.1$^k$ |
| 5% PF-30 + 1% $CaCl_2$ | 81.9 ± 1.6$^e$ | 36.7 ± 3.9$^{ij}$ | 35.0 ± 1.9$^j$ | 43.7 ± 0.9$^h$ | 20.0 ± 5.5$^i$ |
| 2% Melojel + 1% $CaCl_2$ | 86.6 ± 7.1$^d$ | 73.7 ± 1.1$^d$ | 64.7 ± 1.4$^g$ | 45.3 ± 1.9$^{gh}$ | 43.1 ± 1.8$^g$ |
| 2% N-LOK + 1% $CaCl_2$ | 89.9 ± 0.8$^d$ | 64.2 ± 1.7$^f$ | 26.5 ± 2.9$^l$ | 22.6 ± 1.8$^k$ | 22.9 ± 0.4$^i$ |
| 2% Purity + 1% $CaCl_2$ | 77.3 ± 1.3$^f$ | 59.8 ± 1.3$^g$ | 50.0 ± 1.2$^h$ | 42.7 ± 3.6$^h$ | 15.0 ± 1.2$^j$ |
| 2% Cycldex* + 1% $CaCl_2$ | 45.3 ± 2.6$^h$ | 55.8 ± 1.4$^g$ | 30.5 ± 1.4$^k$ | 35.0 ± 0.5$^i$ | 40.5 ± 1.5$^g$ |
| 1% $CaCl_2$ | 65.2 ± 2.9$^g$ | 41.9 ± 4.7$^i$ | 44.6 ± 3.1$^i$ | 17.0 ± 2.7$^l$ | 15.5 ± 1.3$^j$ |
| 0.5% SAPP | 75.4 ± 0.4$^f$ | 85.9 ± 0.5$^e$ | 94.9 ± 0.3$^d$ | 87.3 ± 0.1$^c$ | 67.1 ± 0.2$^f$ |

*cyclodextrin
$^a$percent inhibition based on change in b-value 2–10 h after treatments.
$^b$pH = 5
$^{c-n}$means of 3 to 5 replicates, means in each column followed by different superscripts significantly different at $p \leq 0.05$.

Table 4 shows percent inhibition values, calculated from changes in b values of blanched potato strips

TABLE 6

Inhibition of after-cooking darkening by combination of spraygum and calcium chloride

| Treatments | Percent Inhibition | | | | |
|---|---|---|---|---|---|
| | 2 h | 4 h | 6 h | 8 h | 10 h |
| 2% Spraygum ± 0% $CaCl_2$ | 58.3 ± 1.2$^g$ | 69.6 ± 1.4$^e$ | 74.5 ± 1.5$^f$ | 74.8 ± 1.4$^f$ | 72.1 ± 1.8$^c$ |
| 2% Spraygum ± 0.25% $CaCl_2$ | 69.6 ± 1.5$^e$ | 84.3 ± 2.0$^d$ | 93.6 ± 1.9$^d$ | 83.0 ± 1.5$^e$ | 72.1 ± 2.0$^e$ |
| 2% Spraygum ± 0.5% $CaCl_2$ | 63.8 ± 1.1$^f$ | 94.2 ± 1.4$^c$ | 60.9 ± 1.7$^e$ | 97.1 ± 1.2$^c$ | 90.7 ± 2.5$^d$ |
| 2% Spraygum ± 1% $CaCl_2$ | 88.6 ± 1.7$^c$ | 92.5 ± 0.8$^c$ | 109.7 ± 0.7$^c$ | 83.1 ± 1.3$^e$ | 99.9 ± 1.0$^c$ |
| 0% Spraygum ± 1% $CaCl_2$ | 65.2 ± 2.9$^f$ | 41.9 ± 4.7$^f$ | 27.7 ± 4.1$^g$ | 17.0 ± 2.7$^g$ | 10.8 ± 1.3$^g$ |

TABLE 6-continued

Inhibition of after-cooking darkening by combination of spraygum and calcium chloride

| Treatments | Percent Inhibition | | | | |
|---|---|---|---|---|---|
| | 2 h | 4 h | 6 h | 8 h | 10 h |
| 0.5% SAPP | 75.4 ± 0.4$^d$ | 85.9 ± 0.5$^d$ | 94.9 ± 0.3$^d$ | 87.3 ± 0.1$^d$ | 67.1 ± 0.2$^f$ |

$^a$% inhibition is based on the change of b value.
$^b$pH = 5
$^{c-g}$means of 3 to 5 replicates, means in each column followed by different superscripts significantly different at p ≦ 0.05.

TABLE 7

Influence of pH of sealgum and spraygum solutions on % inhibition of after-cooking darkening in potatoes

| Treatment | Percent Inhibition | | | | |
|---|---|---|---|---|---|
| | 2 h | 4 h | 6 h | 8 h | 10 h |
| 2% sealgum + 1% CaCl$_2$ | | | | | |
| at pH 3 | 83.3 ± 1.7$^h$ | 82.7 ± 0.8$^h$ | 95.9 ± 1.3$^d$ | 93.4 ± 0.9$^d$ | 88.1 ± 2.1$^e$ |
| 4 | 88.5 ± 1.5$^f$ | 91.2 ± 1.4$^f$ | 99.7 ± 1.3$^d$ | 97.3 ± 1.1$^c$ | 86.6 ± 1.7$^{ef}$ |
| 5 | 94.4 ± 0.2$^e$ | 95.4 ± 0.7$^e$ | 96.2 ± 0.3$^d$ | 99.0 ± 0.3$^c$ | 89.8 ± 0.6$^e$ |
| 6 | 92.6 ± 0.6$^e$ | 89.2 ± 1.8$^f$ | 81.9 ± 0.7$^e$ | 98.0 ± 1.1$^c$ | 86.6 ± 2.6$^{fe}$ |
| 2% spraygum + 1% CaCl$_2$ | | | | | |
| at pH 3 | 105.8 ± 0.8$^c$ | 97.7 ± 1.0$^e$ | 96.3 ± 0.8$^d$ | 97.6 ± 0.4$^c$ | 95.9 ± 1.2$^d$ |
| 4 | 104.4 ± 1.4$^c$ | 107.3 ± 1.9$^c$ | 97.8 ± 0.9$^d$ | 97.8 ± 1.5$^c$ | 96.3 ± 2.3$^c$ |
| 5 | 95.1 ± 0.7$^e$ | 101.7 ± 0.5$^d$ | 117.2 ± 0.4$^c$ | 96.5 ± 0.3$^c$ | 99.9 ± 1.0$^c$ |
| 6 | 86.2 ± 0.9$^g$ | 97.7 ± 1.7$^e$ | 83.6 ± 0.9$^e$ | 84.5 ± 1.3$^e$ | 83.5 ± 2.6$^f$ |

$^a$% inhibition is based on the change of b value.
$^b$pH adjusted with conc. HCl or NaOH.
$^{c-g}$means of 3 to 5 replicates, means in each column followed by different superscripts significantly different at p ≦ 0.05.

Tables 5 to 7 show the effect of concentration of Spraygum, concentration of calcium chloride and pH of Spraygum and Sealgum solutions on percent inhibition. It can be seen that dips containing 2 wt % gum and 1 wt % calcium chloride at pH 5 were generally more effective as decolouration inhibitors than the commercially used dip containing 0.5 wt % disodium acid pyrophosphate (SAPP).

TABLE 8

Inhibition of after-cooking darkening in potatoes by pullulans(PF) and combination of pullulan and calcium chloride

| Treatment | Percent Inhibition | | | | |
|---|---|---|---|---|---|
| | 2 | 4 | 6 | 8 | 10 |
| 2% PF-10 | 26.8 ± 3.5$^g$ | 21.0 ± 4.7$^f$ | 12.6 ± 2.7$^e$ | 4.5 ± 5.5$^g$ | 2.6 ± 2.4$^f$ |
| 5% PF-10 | 27.7 ± 2.4$^g$ | 24.3 ± 3.0$^f$ | 15.4 ± 6.3$^e$ | 5.1 ± 4.4$^g$ | 4.0 ± 2.0$^g$ |
| 8% PF-10 | 30.5 ± 3.2$^{fg}$ | 27.0 ± 7.0$^{ef}$ | 15.5 ± 8.0$^e$ | 7.0 ± 9.6$^g$ | 4.1 ± 1.7$^f$ |
| 10% PF-10 | 31.4 ± 4.1$^{fg}$ | 28.7 ± 2.6$^{def}$ | 16.2 ± 10.3$^e$ | 7.2 ± 9.9$^g$ | 5.0 ± 3.5$^f$ |
| 2% PF-30 | 26.3 ± 1.3$^g$ | 20.0 ± 6.1$^f$ | 20.7 ± 6.6$^e$ | 6.2 ± 5.1$^g$ | 6.1 ± 1.3$^f$ |
| 5% PF-30 | 35.4 ± 2.5$^{ef}$ | 26.3 ± 8.4$^{ef}$ | 21.1 ± 2.8$^e$ | 8.4 ± 2.4$^g$ | 5.9 ± 8.1$^f$ |
| 8% PF-30 | 34.2 ± 7.8$^{ef}$ | 28.3 ± 3.0$^{def}$ | 19.0 ± 8.1$^e$ | 15.5 ± 9.6$^{fg}$ | 6.5 ± 2.2$^f$ |
| 10% PF-30 | 39.5 ± 3.6$^e$ | 29.0 ± 5.1$^{def}$ | 24.5 ± 1.4$^e$ | 20.1 ± 3.3$^f$ | 5.7 ± 5.7$^f$ |
| 5% PF-30 + 1% CaCl$_2$ | 81.9 ± 1.6$^c$ | 36.7 ± 3.9$^d$ | 35.0 ± 1.9$^d$ | 43.7 ± 0.9$^d$ | 20.0 ± 5.5$^e$ |
| 5% PF-10 + 1% CaCl$_2$ | 47.7 ± 1.8$^d$ | 35.3 ± 3.2$^{de}$ | 34.5 ± 1.6$^d$ | 30.6 ± 1.1$^e$ | 21.5 ± 1.2$^d$ |
| 0.5% SAPP | 75.4 ± 0.4$^c$ | 85.9 ± 0.5$^c$ | 94.9 ± 0.3$^c$ | 87.3 ± 0.1$^c$ | 67.1 ± 0.2$^c$ |

$^a$percent inhibition is based on the change of b value 2–10 h after treatment.
$^b$pH = 5
$^{c-g}$means of 3 to 5 replicates, means in each column followed by different superscripts significantly different at p < 0.05.

Table 8 shows inhibition values of blanched potato strips by dips containing 2 to 10 wt % pullulan and pullulan in combination with calcium chloride. The results show that molecular weight and concentration of pullulan had little effect on percent inhibition. Percent inhibition decreased rapidly with storage time of samples and approached about 5 wt % only after 10 hours of storage. The combination of pullulan with calcium chloride was much more effective than pullulan alone. Low percent inhibition values shown for pullulan films probably resulted from the high moisture content of the potato strips causing a high oxygen permeability of the pullulan film.

Although preferred embodiments of the invention have been described herein in detail, it will be understood by those skilled in the art that variations may be made thereto without departing from the spirit of the invention or the scope of the appended claims.

What is claimed is:

1. A process for controlling after-cooking darkening in par-fried potato food products susceptible to said after-cooking darkening, which comprises the following steps: a) forming treated potato strips by contacting blanched, rinsed potato strips with an agent in quantities sufficient to inhibit after-cooking darkening, said agent comprising:

i) a first calcium ion component for complexing any chlorogenic acid on the surface of the potato strips, and ii) a second component which inhibits the oxidation of ferrous ion species present on said surface of the potato strips; and b) at least partially frying the said treated potato strips.

2. The process of claim 1, wherein the calcium ion component is present in about a 1 wt. % solution of $CaCl_2$.

3. The process of claim 1, wherein the potato strips are contacted with the agent for about one minute.

4. The process of claim 1, wherein the agent includes calcium acetate.

5. The process of claim 4, wherein the calcium acetate is in a concentration of about 0.5 to 1 wt % solution.

6. The process of claim 4, wherein the calcium acetate solution is at about pH 4 to 5.

7. The process of claim 4, wherein the potato strips are contacted with the solution of calcium acetate for about 30 to 60 seconds.

8. The process of claim 4, further comprising the step of contacting the potato strips with a solution of disodium acid pyrophosphate (SAPP).

9. The process of claim 8, wherein the solution of disodium acid pyrophosphate (SAPP) is in a concentration of about 0.1 wt %.

10. The process of claim 8, wherein the calcium acetate concentration is about 0.4 to 0.5 wt %.

11. The process of claim 8, wherein the pH of the solution of disodium acid pyrophosphate (SAPP) is about 5.

12. The process of claim 1, wherein the first calcium ion component is calcium chloride and the second component is a carbohydrate.

13. The process of claim 12, wherein the carbohydrate is an about 2 wt % gum solution.

14. The process of claim 12, wherein the carbohydrate is a pullulan.

15. The process of claim 12, wherein the carbohydrate is a starch.

16. The process of claim 12, wherein the carbohydrate is a cyclodextrin.

17. The process of claim 12, wherein the calcium chloride concentration is about 1 wt %.

* * * * *